United States Patent
Frey et al.

(10) Patent No.: US 9,034,538 B2
(45) Date of Patent: May 19, 2015

(54) CASTING SOLUTION AND METHOD FOR MAKING A POLYMER ELECTROLYTE MEMBRANE

(75) Inventors: Matthew H. Frey, Cottage Grove, MN (US); Steven J. Hamrock, Stillwater, MN (US); Gregory M. Haugen, Edina, MN (US); Phat T. Pham, Little Canada, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 675 days.

(21) Appl. No.: 12/862,071

(22) Filed: Aug. 24, 2010

(65) Prior Publication Data

US 2010/0316932 A1  Dec. 16, 2010

Related U.S. Application Data

(62) Division of application No. 12/492,612, filed on Jun. 26, 2009, now Pat. No. 7,803,847, which is a division of application No. 10/945,178, filed on Sep. 20, 2004, now Pat. No. 7,572,534.

(51) Int. Cl.
| | |
|---|---|
| H01M 8/02 | (2006.01) |
| C08J 5/22 | (2006.01) |
| H01M 8/10 | (2006.01) |

(52) U.S. Cl.
CPC ......... *C08J 5/2237* (2013.01); *C08J 5/22* (2013.01); *Y10T 29/49108* (2015.01); *H01M 8/1023* (2013.01); *H01M 8/1039* (2013.01); *H01M 8/1048* (2013.01); *H01M 8/1072* (2013.01); *H01M 2300/0082* (2013.01); *Y02E 60/521* (2013.01); *C08J 2327/12* (2013.01)

(58) Field of Classification Search
None
See application file for complete search history.

(56) References Cited

U.S. PATENT DOCUMENTS

| | | | |
|---|---|---|---|
| 3,369,938 A | 2/1968 | Kroeger et al. | |
| 3,382,105 A | 5/1968 | McBryar et al. | |
| 4,021,369 A | 5/1977 | Lyons | |
| 4,284,835 A | 8/1981 | Kim et al. | |
| 4,340,276 A | 7/1982 | Maffitt et al. | |
| 4,358,545 A | 11/1982 | Ezzell et al. | |
| 4,416,801 A | 11/1983 | Waller | |
| 4,433,082 A | 2/1984 | Grot | |
| 4,568,598 A | 2/1986 | Bilkadi et al. | |
| 4,741,744 A | 5/1988 | Wu et al. | |
| 4,752,369 A | 6/1988 | Caldwell et al. | |
| 4,812,352 A | 3/1989 | Debe | |
| 4,824,835 A | 4/1989 | Mertens et al. | |
| 4,866,099 A | 9/1989 | Hendy | |
| 5,039,561 A | 8/1991 | Debe | |
| 5,176,786 A | 1/1993 | Debe | |
| 5,186,877 A | 2/1993 | Watanabe | |
| 5,221,455 A | 6/1993 | Hanada et al. | |
| 5,225,391 A | 7/1993 | Stonehart et al. | |
| 5,294,232 A | 3/1994 | Sakairi et al. | |
| 5,336,558 A | 8/1994 | Debe | |
| 5,338,430 A | 8/1994 | Parsonage et al. | |
| 5,472,799 A | 12/1995 | Watanabe | |
| 5,523,181 A | 6/1996 | Stonehart et al. | |
| 5,766,787 A | 6/1998 | Watanabe et al. | |
| 5,766,788 A | 6/1998 | Inoue et al. | |
| 5,840,192 A | 11/1998 | El Moussaoui et al. | |
| 5,879,827 A | 3/1999 | Debe et al. | |
| 5,879,828 A | 3/1999 | Debe et al. | |
| 5,958,822 A | 9/1999 | Beckerbauer et al. | |
| 6,040,077 A | 3/2000 | Debe et al. | |
| 6,059,943 A | 5/2000 | Murphy et al. | |
| 6,156,184 A * | 12/2000 | Antonucci et al. | 205/334 |
| 6,242,135 B1 | 6/2001 | Mushiake | |
| 6,319,293 B1 | 11/2001 | Debe et al. | |
| 6,335,112 B1 | 1/2002 | Asukabe et al. | |
| 6,624,328 B1 | 9/2003 | Guerra | |
| 6,630,263 B1 | 10/2003 | McElroy | |
| 6,635,384 B2 | 10/2003 | Bahar et al. | |
| 6,649,295 B2 | 11/2003 | Hamrock et al. | |
| 6,680,138 B1 | 1/2004 | Honma et al. | |
| 6,864,006 B2 | 3/2005 | Honma et al. | |
| 7,220,509 B2 | 5/2007 | Merzougui et al. | |
| 7,572,534 B2 | 8/2009 | Frey et al. | |
| 7,622,217 B2 | 11/2009 | Debe et al. | |
| 7,803,847 B2 | 9/2010 | Frey et al. | |
| 7,879,475 B2 | 2/2011 | Toyoda | |
| 7,989,115 B2 | 8/2011 | Durante | |

(Continued)

FOREIGN PATENT DOCUMENTS

| | | |
|---|---|---|
| EP | 0 459 820 B1 | 4/1991 |
| EP | 0 631 337 B1 | 7/2000 |

(Continued)

OTHER PUBLICATIONS

A. Bonakdarpour et al., "Corrosion of Transition Metals, in $Pt_{1-x}M_x$ Proton Exchange Membrane Fuel Cell Electrocatalysts", 2004 Fall Meeting of the Electrochemical Society of Japan, Hawaii, Oct. 3-8, 2004.

(Continued)

*Primary Examiner* — Ula C Ruddock
*Assistant Examiner* — Tony Chuo
(74) *Attorney, Agent, or Firm* — Gregory D. Allen

(57) ABSTRACT

Fuel cell membrane electrode assemblies and fuel cell polymer electrolyte membranes are provided comprising bound anionic functional groups and polyvalent cations, such as Mn or Ru cations, which demonstrate increased durability. Methods of making same are also provided.

49 Claims, No Drawings

(56) References Cited

U.S. PATENT DOCUMENTS

| | | | |
|---|---|---|---|
| 2001/0031388 A1* | 10/2001 | Hamrock et al. | 429/30 |
| 2002/0004453 A1 | 1/2002 | Haugen et al. | |
| 2002/0015875 A1 | 2/2002 | Kim | |
| 2002/0058172 A1 | 5/2002 | Datz et al. | |
| 2002/0076594 A1 | 6/2002 | Fukuda et al. | |
| 2002/0093008 A1 | 7/2002 | Kerres et al. | |
| 2002/0132157 A1 | 9/2002 | Finkelshtain et al. | |
| 2003/0008196 A1 | 1/2003 | Wessel et al. | |
| 2003/0013004 A1 | 1/2003 | Oyanagi et al. | |
| 2004/0043283 A1 | 3/2004 | Cipollini et al. | |
| 2004/0048129 A1 | 3/2004 | Taft, III et al. | |
| 2004/0048466 A1 | 3/2004 | Gore et al. | |
| 2004/0053098 A1 | 3/2004 | Schiffrin et al. | |
| 2004/0116742 A1 | 6/2004 | Guerra | |
| 2004/0121210 A1 | 6/2004 | Hamrock et al. | |
| 2004/0251450 A1 | 12/2004 | Kerres et al. | |
| 2005/0069755 A1 | 3/2005 | Vernstrom et al. | |
| 2005/0136308 A1 | 6/2005 | Andrews et al. | |
| 2006/0019140 A1 | 1/2006 | Kawazoe et al. | |
| 2006/0046120 A1 | 3/2006 | Merzougui et al. | |
| 2006/0063054 A1 | 3/2006 | Frey et al. | |
| 2006/0063055 A1 | 3/2006 | Frey et al. | |
| 2006/0099475 A1 | 5/2006 | Watanabe et al. | |
| 2006/0166069 A1 | 7/2006 | Min | |
| 2006/0231484 A1 | 10/2006 | Haring et al. | |
| 2007/0082814 A1 | 4/2007 | Debe et al. | |
| 2007/0099052 A1 | 5/2007 | Frey et al. | |
| 2007/0099053 A1 | 5/2007 | Frey et al. | |
| 2010/0062314 A1 | 3/2010 | Frey et al. | |

FOREIGN PATENT DOCUMENTS

| | | |
|---|---|---|
| EP | 1 133 806 B1 | 9/2002 |
| GB | 149233 | 1/1922 |
| GB | 1 449 233 | 9/1976 |
| GB | 1534359 | 12/1978 |
| JP | 54-82042 A2 | 6/1979 |
| JP | 2000-106203 | 4/2000 |
| JP | 2001-118591 | 4/2001 |
| JP | 2001-321664 | 11/2001 |
| JP | 2003-059497 | 2/2003 |
| JP | 2003-123777 A2 | 4/2003 |
| JP | HEI-2003-282097 | 10/2003 |
| JP | 2004-018573 | 1/2004 |
| JP | 2004-134294 | 4/2004 |
| JP | 1 627 3384 | 9/2004 |
| JP | 2004-288620 | 10/2004 |
| KR | 2000-063843 | 6/2000 |
| WO | WO 00/24074 | 4/2000 |
| WO | WO 01/54216 A2 | 7/2001 |
| WO | WO 02/061871 A2 | 8/2002 |
| WO | WO 03/007412 A1 | 1/2003 |
| WO | WO 03/072854 A2 | 9/2003 |
| WO | 2005/060039 A1 | 6/2005 |

OTHER PUBLICATIONS

G. M. Chow et al.; "Fabrication Of Biologically Based Microstructure Composites For Vacuum Field Emission", Materials Science and Engineering, A158, 1992, pp. 1-6.

M. K. Debe, K. K. Kam, J. C. Liu, and R. J. Poirier; "Vacuum Vapor Deposited Thin Films Of A Perylene Dicarboximide Derivative: Microstructure Versus Deposition Parameters", J. Vac. Sci Technol. A, 6 (3), May/Jun. 1988, pp. 1907-1911.

M. K. Debe and R. J. Poirer; "Effect Of Gravity On Copper Phthalocyanine Thin Films III: Microstructure Comparisons Of Copper Phthalocyanine Thin Films Grown In Microgravity And Unit Gravity", Thin Solid Films, vol. 186, 1990, pp. 327-347.

M. Debe, A. Steinbach, K. Lewinski, G. Haugen, G. Vernstrom, R. Atanasoski, A. Hester, P. Turner, R. Ziegler, J. Larson, M. Hicks, and P. Serim; "Activities Of Low Pt Loading, Carbon-Less, Ultra-Thin Nanostructured Film-Based Electrodes For PEM Fuel Cells And Roll-Good Fabricated MEA Performances In Single Cells And Stacks", 2003 Fuel Cell Seminar, Fuel Cells for Secure, Sustainable Energy, Abstracts, Nov. 3-7, 2003, Miami Beach, Florida, Fontainebleau Hilton Hotel, pp. 812-815.

Dupont™ Nafion® PFSA Products Perfluorosulfonic Acid Polymer Technical Information; "Safe Handling and Use Of Perfluorosulfonic Acid Products", Feb. 2004, pp. 1-4.

Goering et al., "Role of Ion-Exchange Membrane Morphology and Sorption Properties in Facilitated Transport di-olefin/mono-olefin Separations", Journal of Membrane Science, vol. 144, 1998, pp. 133-143.

J. Guan and G. Li, "Studies on Preparation of Ultrafine MnO Particles and Its Eletrocatalytic Performance in PEMFC", Huaxue Shijie 43 [1] (2002) pp. 7-9.

K. K. Kam, M. K. Debe, R. J. Poirier, and A. R. Drube; "Summary Abstract: Dramatic Variation Of The Physical Microstructure Of A Vapor Deposited Organic Thin Film", J. Vac. Sci. Technol, A, 5(4), Jul./Aug. 1987, pp. 1914-1916.

Sang-Hee Kwak, TaeHyun Yang, Chang-Soo Kim, and Ki Hyun Yoon; "Performance Evaluation of Platinum Dispersed Self-Humidifying Polymer Electrolyte Membrance Prepared by Using RF Magnetron Sputter", Journal of the Korean Ceramic Society, vol. 40, No. 2, 2003, pp. 118-122.

S. Kawatsu and M. Iwase, "Electrocatalysts for Polymer Electrolyte Fuel Cells", Jidosha Gijutsukai Ronbunshu (Transaction of the Society Automotive Engineers of Japan), vol. 28, No. 4, (Oct. 1997), pp. 39-42.

P. K. Lee and M. K. Debe, "Measurement And Modeling Of The Reflectance-Reducing Properties Of Gradient Index Microstructured Surfaces", Photographic Science and Engineering, vol. 24, (4), Jul./Aug., 1980, pp. 211-216.

Fuqiang Liu, Baolian Yi, Danmin Xing, Jingrong Yu, Zhongjun Hou, Yongzhu Fu; "Development of Novel Self-Humidifying Composite Membranes for Fuel Cells", Journal of Power Sources, vol. 124, 2003, pp. 81-89.

Mikael Ludvigsson, Jan Lindgren, and Jörgen Tegenfeldt; "Incorporation And Characterisation Of Oxides Of Manganese, Cobalt, And Lithium Into Nafion 117 Membranes", Journal Materials Chemistry, vol. 11, Feb. 15, 2001, pp. 1269-1276.

A. Michas, J. M. Kelly, R. Durand, M. Pineri, and J.M.D. Coey; "Preparation, Characterization And Catalytic Properties Of Perfluorosulfonated Ion-Exchange Membranes Containing Surface-Concentrated, Hydrated Ruthenium Oxide Particles"; Journal of Membrane Science, Elsevier Science Publishers B.V., Amsterdam—Printed in The Netherlands; vol. 29, No. 3, Dec. 15, 1986, pp. 239-257.

S. Ohnuma, Y. Nakanouchi, and T. Masumoto; "Amorphous Ultrafine Metallic Particles Prepared By Sputtering Method", Rapidly Quenched Metals, Proc. Of the Fifth Int. Conf. On Rapidly Quenched Metals, Wurzburg, Germany, Sep. 3-7, 1984, S. Steeb et al., eds., Elsevier Science Publisher B.V., New York, 1985, pp. 1117-1124.

Y. Sadaoka, T. A. Jones, G. S. Revell, W. Gopel; Effects Of Morphology on $NO_2$ Detection In Air At Room Temperature With Phthalocyanine Thin Films, Journal of Materials Science, vol. 25, 1990, pp. 5257-5268.

H. Tang, J. H. Chen, Z. P. Huang, D. Z. Wang, Z. F. Ren, L. H. Nie, Y. F. Kuang, and S. Z. Yao; "High Dispersion And Electrocatalytic Properties Of Platinum On Well-Aligned Carbon Nanotube Arrays", Carbon, vol. 42, 2004, pp. 191-197.

* cited by examiner

CASTING SOLUTION AND METHOD FOR MAKING A POLYMER ELECTROLYTE MEMBRANE

CROSS REFERENCE TO RELATED APPLICATION

This application is a divisional of U.S. Ser. No. 12/492,612, filed Jun. 26, 2009, now issued as U.S. Pat. No. 7,803,847, the disclosure of which is incorporated by reference in its entirety herein, which is a divisional of U.S. Ser. No. 10/945,178, filed Sep. 20, 2004, now issued as U.S. Pat. No. 7,572,534, the disclosure of which is incorporated by reference in its entirety herein.

FIELD OF THE INVENTION

This invention relates to fuel cell membrane electrode assemblies and fuel cell polymer electrolyte membranes comprising bound anionic functional groups and polyvalent cations such as Mn or Ru cations which demonstrate increased durability, and methods of making same.

BACKGROUND OF THE INVENTION

Ludvigson, J. Mater. Chem., 11 (2001) 1269-1276; Michas, J. Membrane Sci., 29 (1986) 239-257 and Japanese Kokai 2001/118591 (Morimoto) purportedly disclose polymer electrolyte membranes made by a method generally described as immersion of a membrane in a solution of a metal salt followed by an oxidization step to convert the metal salts into metal oxides in the finished product. The metal salts include Mn salts (in Ludvigson) and Ru salts (in Michas and Morimoto).

Copolymers of tetrafluoroethylene (TFE) and a co-monomer according to the formula: $FSO_2$—$CF_2$—$CF_2$—O—CF($CF_3$)—$CF_2$—O—CF=$CF_2$ are known and sold in sulfonic acid form, i.e., with the $FSO_2$— end group hydrolyzed to $HSO_3$—, under the trade name Nafion® by DuPont Chemical Company, Wilmington, Del. Nafion® is commonly used in making polymer electrolyte membranes for use in fuel cells.

Copolymers of tetrafluoroethylene (TFE) and a co-monomer according to the formula: $FSO_2$—$CF_2$—$CF_2$—O—CF=$CF_2$ are known and used in sulfonic acid form, i.e., with the $FSO_2$— end group hydrolyzed to $HSO_3$—, in making polymer electrolyte membranes for use in fuel cells.

U.S. patent application Ser. No. 10/325,278, filed Dec. 19, 2002, the disclosure of which is incorporated herein by reference, discloses a polymer electrolyte membrane having a thickness of 90 microns or less and comprising a polymer, said polymer comprising a highly fluorinated backbone and recurring pendant groups according to the formula:

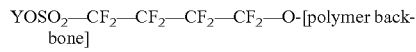

where Y is H+ or a monovalent cation such as an alkali metal cation. Typically, the membrane is a cast membrane. Typically, the polymer has a hydration product of greater than 22,000. Typically, the polymer has an equivalent weight of 800-1200.

SUMMARY OF THE INVENTION

Briefly, the present invention provides a fuel cell membrane electrode assembly comprising a polymer electrolyte membrane which comprises a polymer that comprises bound anionic functional groups, wherein the polymer electrolyte membrane additionally comprises cations selected from the group consisting of manganese cations and ruthenium cations. Typically, the amount of the cations present is between 0.001 and 0.5 charge equivalents based on the molar amount of anionic functional groups present in the polymer electrolyte, more typically between 0.005 and 0.2, more typically between 0.01 and 0.1, and more typically between 0.02 and 0.05. Typically, the distribution of the cations across the thickness of the polymer electrolyte membrane is uniform. Typically the cations are polyvalent cations. More typically the cations are manganese cations. Typically the cations are $Mn^{2+}$ cations or $R^{3+}$ cations, most typically $Mn^{2+}$ cations. The cations may also be $Mn^{3+}$, $Mn^{4+}$, or $R^{4+}$. The polymer may have an equivalent weight of 1200 or less, more typically 1000 or less, more typically 900 or less, and more typically 800 or less. The polymer may be highly fluorinated or perfluorinated, and may comprise pendent groups according to the formula: —O—$CF_2$—$CF_2$—$CF_2$—$CF_2SO_3H$ or the formula: —O—$CF_2$—CF($CF_3$)—O—$CF_2$—$CF_2$—$SO_3H$.

In another aspect, the present invention provides a fuel cell membrane electrode assembly comprising a polymer electrolyte membrane which comprises a polymer that comprises bound anionic functional groups, wherein at least a portion of the anionic functional groups are in acid form and at least a portion of the anionic functional groups are neutralized by cations selected from the group consisting of manganese cations and ruthenium cations. Typically, the amount of the cations present is between 0.001 and 0.5 charge equivalents based on the molar amount of anionic functional groups present in the polymer electrolyte, more typically between 0.005 and 0.2, more typically between 0.01 and 0.1, and more typically between 0.02 and 0.05. Typically, the distribution of the cations across the thickness of the polymer electrolyte membrane is uniform. Typically the cations are polyvalent cations. More typically the cations are manganese cations. Typically the cations are $Mn^{2+}$ cations or $R^{3+}$ cations, most typically $Mn^{2+}$ cations. The cations may also be $Mn^{3+}$, $Mn^{4+}$, or $R^{4+}$. The polymer may have an equivalent weight of 1200 or less, more typically 1000 or less, more typically 900 or less, and more typically 800 or less. The polymer may be highly fluorinated or perfluorinated, and may comprise pendent groups according to the formula: —O—$CF_2$—$CF_2$—$CF_2$—$CF_2$—$SO_3H$ or the formula: —O—$CF_2$—CF($CF_3$)—O—$CF_2$—$CF_2$—$SO_3H$.

In another aspect, the present invention provides a polymer electrolyte membrane which comprises a polymer that comprises bound anionic functional groups, wherein the polymer electrolyte membrane additionally comprises cations selected from the group consisting of manganese cations and ruthenium cations, and wherein the amount of cations selected from the group consisting of manganese cations and ruthenium cations present is between 0.001 and 0.5 charge equivalents based on the molar amount of acid functional groups present in the polymer electrolyte, more typically between 0.005 and 0.2, more typically between 0.01 and 0.1, and more typically between 0.02 and 0.05. Typically, the distribution of the cations across the thickness of the polymer electrolyte membrane is uniform. Typically the cations are polyvalent cations. More typically the cations are manganese cations. Typically the cations are $Mn^{2+}$ cations or $R^{3+}$ cations, most typically $Mn^{2+}$ cations. The cations may also be $Mn^{3+}$, $Mn^{4+}$, or $R^{4+}$. The polymer may have an equivalent weight of 1200 or less, more typically 1000 or less, more typically 900 or less, and more typically 800 or less. The polymer may be highly fluorinated or perfluorinated, and may comprise pendent groups according to the formula: —O—CF$_2$—CF$_2$—CF$_2$—CF$_2$—SO$_3$H or the formula: —O—CF$_2$—CF(CF$_3$)—O—CF$_2$—CF$_2$—SO$_3$H.

In another aspect, the present invention provides a polymer electrolyte membrane which comprises a polymer that comprises bound anionic functional groups, wherein at least a portion of the anionic functional groups are in acid form and at least a portion of the anionic functional groups are neutralized by cations selected from the group consisting of manganese cations and ruthenium cations, and wherein the amount of cations selected from the group consisting of manganese cations and ruthenium cations present is between 0.001 and 0.5 charge equivalents based on the molar amount of acid functional groups present in the polymer electrolyte, more typically between 0.005 and 0.2, more typically between 0.01 and 0.1, and more typically between 0.02 and 0.05. Typically, the distribution of the cations across the thickness of the polymer electrolyte membrane is uniform. Typically the cations are polyvalent cations. More typically the cations are manganese cations. Typically the cations are Mn$^{2+}$ cations or R$^{3+}$ cations, most typically Mn$^{2+}$ cations. The cations may also be Mn$^{3+}$, Mn$^{4+}$, or R$^{4+}$. The polymer may have an equivalent weight of 1200 or less, more typically 1000 or less, more typically 900 or less, and more typically 800 or less. The polymer may be highly fluorinated or perfluorinated, and may comprise pendent groups according to the formula: —O—CF$_2$—CF$_2$—CF$_2$—CF$_2$—SO$_3$H or the formula: —O—CF$_2$—CF(CF$_3$)—O—CF$_2$—CF$_2$—SO$_3$H.

In another aspect, the present invention provides a method of making a polymer electrolyte membrane comprising the steps of: a) providing a polymer electrolyte comprising bound anionic functional groups; b) adding 0.001 to 0.5 charge equivalents of one or more salts selected from the group consisting of manganese and ruthenium salts, based on the molar amount of the acidic functional groups; and c) forming a membrane comprising the polymer electrolyte. More typically between 0.005 and 0.2 charge equivalents are added, more typically between 0.01 and 0.1, and more typically between 0.02 and 0.05. Typically the cations are polyvalent cations. More typically the cations are manganese cations. Typically the cations are Mn$^{2+}$ cations or R$^{3+}$ cations, most typically Mn$^{2+}$ cations. The cations may also be Mn$^{3+}$, Mn$^{4+}$, or R$^{4+}$. The polymer may have an equivalent weight of 1200 or less, more typically 1000 or less, more typically 900 or less, and more typically 800 or less. The polymer may be highly fluorinated or perfluorinated, and may comprise pendent groups according to the formula: —O—CF$_2$—CF$_2$—CF$_2$—CF$_2$—SO$_3$H or the formula: —O—CF$_2$—CF(CF$_3$)—O—CF$_2$—CF$_2$—SO$_3$H. The polymer electrolyte membrane thus formed may be incorporated into a membrane electrode assembly.

In another aspect, the present invention provides a fuel cell membrane electrode assembly comprising at least one polymer that comprises bound anionic functional groups, wherein the electrode additionally comprises manganese cations. Typically, the amount of the cations present is between 0.001 and 0.5 charge equivalents based on the molar amount of anionic functional groups present in the polymer electrolyte, more typically between 0.005 and 0.2, more typically between 0.01 and 0.1, and more typically between 0.02 and 0.05. Typically the cations are polyvalent cations. More typically the cations are manganese cations. Typically the cations are Mn$^{2+}$ cations. The polymer may have an equivalent weight of 1200 or less, more typically 1000 or less, more typically 900 or less, and more typically 800 or less. The polymer may be highly fluorinated or perfluorinated, and may comprise pendent groups according to the formula: —O—CF$_2$—CF$_2$—CF$_2$—CF$_2$—SO$_3$H or the formula: —O—CF$_2$—CF(CF$_3$)—O—CF$_2$—CF$_2$—SO$_3$H.

In another aspect, the present invention provides a fuel cell membrane electrode assembly comprising at least one polymer that comprises bound anionic functional groups, wherein at least a portion of said anionic functional groups are in acid form and at least a portion of said anionic functional groups are neutralized by manganese cations. Typically, the amount of the cations present is between 0.001 and 0.5 charge equivalents based on the molar amount of anionic functional groups present in the polymer electrolyte, more typically between 0.005 and 0.2, more typically between 0.01 and 0.1, and more typically between 0.02 and 0.05. Typically the cations are polyvalent cations. More typically the cations are manganese cations. Typically the cations are Mn$^{2+}$ cations. The polymer may have an equivalent weight of 1200 or less, more typically 1000 or less, more typically 900 or less, and more typically 800 or less. The polymer may be highly fluorinated or perfluorinated, and may comprise pendent groups according to the formula: —O—CF$_2$—CF$_2$—CF$_2$—CF$_2$—SO$_3$H or the formula: —O—CF$_2$—CF(CF$_3$)—O—CF$_2$—CF$_2$—SO$_3$H.

In this application:

"uniform" distribution of an additive in a polymer membrane means that the amount of additive present does not vary more than +/−90%, more typically not more than +/−50% and more typically not more than +/−20%;

"equivalent weight" (EW) of a polymer means the weight of polymer which will neutralize one equivalent of base;

"polyvalent cation" means a cation having a charge of 2+ or greater;

"highly fluorinated" means containing fluorine in an amount of 40 wt % or more, typically 50 wt % or more and more typically 60 wt % or more; and "acid form" means, with regard to an anionic functional group, that it is neutralized by a proton.

It is an advantage of the present invention to provide a fuel cell membrane electrode assembly and polymer electrolyte membrane and methods of making same which provide increased durability.

DETAILED DESCRIPTION

The present invention provides a polymer electrolyte membrane (PEM) which comprises a polymer that comprises bound anionic functional groups and cations selected from the group consisting of manganese cations and ruthenium cations, or a fuel cell membrane electrode assembly (MEA) comprising such a PEM. Typically, at least a portion of the anionic functional groups are in acid form and at least a portion of the anionic functional groups are neutralized by the Mn or Ru cations. Typically, the amount of the cations present is between 0.001 and 0.5 charge equivalents based on the molar amount of acid functional groups present in the polymer electrolyte. Typically, the distribution of the cations across the thickness of the PEM is uniform.

The membrane electrode assembly (MEA) and polymer electrolyte membrane (PEM) according to the present invention may be used in fuel cells. An MEA is the central element of a proton exchange membrane fuel cell, such as a hydrogen fuel cell. Fuel cells are electrochemical cells which produce usable electricity by the catalyzed combination of a fuel such as hydrogen and an oxidant such as oxygen. Typical MEA's comprise a polymer electrolyte membrane (PEM) (also known as an ion conductive membrane (ICM)), which functions as a solid electrolyte. One face of the PEM is in contact with an anode electrode layer and the opposite face is in contact with a cathode electrode layer. In typical use, protons are formed at the anode via hydrogen oxidation and transported across the PEM to the cathode to react with oxygen, causing electrical current to flow in an external circuit connecting the electrodes. Each electrode layer includes electrochemical catalysts, typically including platinum metal. The PEM forms a durable, non-porous, electrically non-conductive mechanical barrier between the reactant gases, yet it also passes $H^+$ ions readily. Gas diffusion layers (GDL's) facilitate gas transport to and from the anode and cathode electrode materials and conduct electrical current. The GDL is both porous and electrically conductive, and is typically composed of carbon fibers. The GDL may also be called a fluid transport layer (FTL) or a diffuser/current collector (DCC). In some embodiments, the anode and cathode electrode layers are applied to GDL's and the resulting catalyst-coated GDL's sandwiched with a PEM to form a five-layer MEA. The five layers of a five-layer MEA are, in order: anode GDL, anode electrode layer, PEM, cathode electrode layer, and cathode GDL. In other embodiments, the anode and cathode electrode layers are applied to either side of the PEM, and the resulting catalyst-coated membrane (CCM) is sandwiched between two GDL's to form a five-layer MEA.

The PEM according to the present invention may comprise any suitable polymer electrolyte. The polymer electrolytes useful in the present invention typically bear anionic functional groups bound to a common backbone, which are typically sulfonic acid groups but may also include carboxylic acid groups, imide groups, amide groups, or other acidic functional groups. The polymer electrolytes useful in the present invention are typically highly fluorinated and most typically perfluorinated, but may also be partially fluorinated or non-fluorinated. The polymer electrolytes useful in the present invention are typically copolymers of tetrafluoroethylene and one or more fluorinated, acid-functional comonomers. Typical polymer electrolytes include Nafion® (DuPont Chemicals, Wilmington Del.) and Flemion™ (Asahi Glass Co. Ltd., Tokyo, Japan). The polymer electrolyte may be a copolymer of tetrafluoroethylene (TFE) and $FSO_2$—$CF_2CF_2CF_2CF_2$—O—CF=$CF_2$, described in U.S. patent application Ser. Nos. 10/322,254, 10/322,226 and 10/325,278, which are incorporated herein by reference. The polymer typically has an equivalent weight (EW) of 1200 or less, more typically 1100 or less, more typically 1000 or less, more typically 900 or less, and more typically 800 or less. In addition to fluorinated membranes, membranes useful in the present invention include hydrocarbon polymers, including aromatic polymers. Examples of useful hydrocarbon polymers include sulfonated polyetheretherketone, sulfonated polysulfone, and sulfonated polystyrene.

The polymer can be formed into a membrane by any suitable method. The polymer is typically cast from a suspension. Any suitable casting method may be used, including bar coating, spray coating, slit coating, brush coating, and the like. Alternately, the membrane may be formed from neat polymer in a melt process such as extrusion. After forming, the membrane may be annealed, typically at a temperature of 120° C. or higher, more typically 130° C. or higher, most typically 150° C. or higher. The PEM typically has a thickness of less than 50 microns, more typically less than 40 microns, more typically less than 30 microns, and most typically about 25 microns.

In one embodiment of the present invention, a salt of manganese or ruthenium, more typically manganese, is added to the acid form polymer electrolyte prior to membrane formation. Typically the salt is mixed well with or dissolved within the polymer electrolyte to achieve substantially uniform distribution. The salt may comprise any suitable anion, including chloride, bromide, nitrate, carbonate and the like. Once cation exchange occurs between the transition metal salt and the acid form polymer, it may be desirable for the acid formed by combination of the liberated proton and the original salt anion to be removed. Thus, it may be preferred to use anions that generate volatile or soluble acids, for example chloride or nitrate. Manganese cations may be in any suitable oxidation state, including $Mn^{2+}$, $Mn^{3+}$ and $Mn^{4+}$, but are most typically $Mn^{2+}$. Ruthenium cations may be in any suitable oxidation state, including $R^{3+}$ and $R^{4+}$, but are most typically $R^{3+}$. Without wishing to be bound by theory, it is believed that the manganese or ruthenium cations persist in the polymer electrolyte because they are exchanged with $H^+$ ions from the anion groups of the polymer electrolyte and become associated with those anion groups. Furthermore, it is believed that polyvalent manganese or ruthenium cations may form crosslinks between anion groups of the polymer electrolyte, further adding to the stability of the polymer. The amount of salt added is typically between 0.001 and 0.5 charge equivalents based on the molar amount of acid functional groups present in the polymer electrolyte, more typically between 0.005 and 0.2, more typically between 0.01 and 0.1, and more typically between 0.02 and 0.05.

To make an MEA or CCM, catalyst may be applied to the PEM by any suitable means, including both hand and machine methods, including hand brushing, notch bar coating, fluid bearing die coating, wire-wound rod coating, fluid bearing coating, slot-fed knife coating, three-roll coating, or decal transfer. Coating may be achieved in one application or in multiple applications.

Any suitable catalyst may be used in the practice of the present invention. Typically, carbon-supported catalyst particles are used. Typical carbon-supported catalyst particles are 50-90% carbon and 10-50% catalyst metal by weight, the catalyst metal typically comprising Pt for the cathode and Pt and Ru in a weight ratio of 2:1 for the anode. Typically, the catalyst is applied to the PEM or to the FTL in the form of a catalyst ink. Alternately, the catalyst ink may be applied to a transfer substrate, dried, and thereafter applied to the PEM or to the FTL as a decal. The catalyst ink typically comprises polymer electrolyte material, which may or may not be the same polymer electrolyte material which comprises the PEM. The catalyst ink typically comprises a dispersion of catalyst particles in a dispersion of the polymer electrolyte. The ink typically contains 5-30% solids (i.e. polymer and catalyst) and more typically 10-20% solids. The electrolyte dispersion is typically an aqueous dispersion, which may additionally contain alcohols and polyalcohols such a glycerin and ethylene glycol. The water, alcohol, and polyalcohol content may be adjusted to alter rheological properties of the ink. The ink typically contains 0-50% alcohol and 0-20% polyalcohol. In addition, the ink may contain 0-2% of a suitable dispersant. The ink is typically made by stirring with heat followed by dilution to a coatable consistency.

In one embodiment of the present invention, the electrode or the catalyst ink comprises a polymer that comprises bound anionic functional groups and cations selected from the group consisting of manganese cations, as provided herein for polymers comprising a PEM according to the present invention. Typically, at least a portion of the anionic functional groups are in acid form and at least a portion of the anionic functional groups are neutralized by the Mn cations, as provided herein for polymers comprising a PEM according to the present invention.

To make an MEA, GDL's may be applied to either side of a CCM by any suitable means. Any suitable GDL may be used in the practice of the present invention. Typically the GDL is comprised of sheet material comprising carbon fibers. Typically the GDL is a carbon fiber construction selected from woven and non-woven carbon fiber constructions. Carbon fiber constructions which may be useful in the practice of the present invention may include: Toray™ Carbon Paper, SpectraCarb™ Carbon Paper, AFN™ non-woven carbon cloth, Zoltek™ Carbon Cloth, and the like. The GDL may be coated or impregnated with various materials, including carbon particle coatings, hydrophilizing treatments, and hydrophobizing treatments such as coating with polytetrafluoroethylene (PTFE).

In use, the MEA according to the present typically sandwiched between two rigid plates, known as distribution plates, also known as bipolar plates (BPP's) or monopolar plates. Like the GDL, the distribution plate must be electrically conductive. The distribution plate is typically made of a carbon composite, metal, or plated metal material. The distribution plate distributes reactant or product fluids to and from the MEA electrode surfaces, typically through one or more fluid-conducting channels engraved, milled, molded or stamped in the surface(s) facing the MEA(s). These channels are sometimes designated a flow field. The distribution plate may distribute fluids to and from two consecutive MEA's in a stack, with one face directing fuel to the anode of the first MEA while the other face directs oxidant to the cathode of the next MEA (and removes product water), hence the term "bipolar plate." Alternately, the distribution plate may have channels on one side only, to distribute fluids to or from an MEA on only that side, which may be termed a "monopolar plate." The term bipolar plate, as used in the art, typically encompasses monopolar plates as well. A typical fuel cell stack comprises a number of MEA's stacked alternately with bipolar plates.

This invention is useful in the manufacture and operation of fuel cells.

Objects and advantages of this invention are further illustrated by the following examples, but the particular materials and amounts thereof recited in these examples, as well as other conditions and details, should not be construed to unduly limit this invention.

EXAMPLES

Unless otherwise noted, reagents may be available from Aldrich Chemical Co., Milwaukee, Wis., or may be synthesized by known methods.

Ionomer

The ionomer used in each of the following Examples is a copolymer of tetrafluoroethylene (TFE) and $FSO_2$—$CF_2CF_2CF_2CF_2$—O—$CF$=$CF_2$ (Comonomer A). Comonomer A was made according to the procedures disclosed in U.S. patent application Ser. Nos. 10/322,254 and 10/322,226, incorporated herein by reference. Polymerization was performed by aqueous emulsion polymerization as described in U.S. patent application Ser. No. 10/325,278. The equivalent weight (EW) was 1000.

Example 1

0.025 mmol $Mn^{2+}$/g Ionomer 20 grams of an ionomer casting solution containing 16.7% solids (i.e., 3.34 g of the ionomeric polymer) in 70:30 n-propanol/water was dispensed into a glass vial. 0.0288 g of 52 wt % $Mn(NO_3)_2$ (J. T. Baker 2544-01, Phillipsburg, N.J.) (i.e., 0.0837 mmol $Mn^{2+}$) was added to the casting dispersion with stirring, and allowed to homogenize for 2 hours. Since the EW of the polymer is 1000, 0.05 charge equivalents of $Mn^{2+}$ were added, based on the molar amount of acid functional groups initially present in the polymer. A membrane was cast on window glass by "hand-spread" technique using the 20 mil gap of a 4-inch multiple clearance applicator (Cat. No. PAR-5357, BYK-Gardner, Columbia, Md.). The membrane film was allowed to dry in room temperature air for 20 minutes, placed in an 80° C. oven for 10 minutes, and then placed in a 200° C. oven for 15 minutes. The membrane was then exposed to liquid water, causing it to lift from the glass. The resulting annealed membrane was reddish-brown in color and homogeneous (i.e., non-light-scattering) to the eye.

Example 2

0.050 mmol $Mn^{2+}$/g Ionomer

The procedure of Example 1 was repeated using the same ionomer casting solution, except that the amount of 52 wt % $Mn(NO_3)_2$ added was increased to 0.0577 g (i.e., 0.168 mmol $Mn^{2+}$). Since the EW of the polymer is 1000, 0.10 charge equivalents of $Mn^{2+}$ were added. Again, the annealed membrane was reddish-brown in color and homogeneous (i.e., non-light-scattering) to the eye.

Example 3

0.034 mmol $R^{3+}$/g Ionomer

The procedure of Example 1 was repeated ionomer casting solution, except that the $Mn(NO_3)_2$ was replaced with a solution of $RuCl_3$. 0.0276 g of $RuCl_3$-$xH_2O$ (41.82% Ru)(Alfa Aesar #11043, Ward Hill, Mass.) (i.e., 0.114 mmol $R^{3+}$) was added to 0.90 g of ethanol (AAPER Alcohol and Chemical Co., Shelbyville, Ky.) with stirring to form a ruthenium doping solution. After dissolution at room temperature, the doping solution was added to the casting dispersion with stirring, and allowed to homogenize for 2 hours. Since the EW of the polymer is 1000, 0.10 charge equivalents of $R^{3+}$ were added. The annealed membrane was reddish-purple in color and homogeneous (i.e., non-light-scattering) to the eye.

Example 4

0.068 mmol $R^{3+}$/g Ionomer

The procedure of Example 3 was repeated using the same ionomer casting solution, except that the amount of $RuCl_3$-$xH_2O$ added was increased to 0.0552 g (i.e., 0.228 mmol $R^{3+}$). Since the EW of the polymer is 1000, 0.20 charge equivalents of $R^{3+}$ were added. The annealed membrane was purple-grey in color and homogeneous (i.e., non-light-scattering) to the eye.

Example 5C (Comparative): No added Mn or Ru

The procedure of Example 1 was repeated using the same ionomer casting solution, except that no Mn or Ru salts were added. The annealed membrane was reddish-brown in color and homogeneous (non-light-scattering) to the eye.

Test Methods and Results for Examples 1-4 and 5C

Oxidative stability of the perfluorinated ionomer membranes made in Examples 1-4 and 5C was tested as follows. A sample of membrane weighing approximately 0.03-0.06 g is weighed and then immersed in 50 g of hydrogen peroxide solution (1M starting concentration) in a glass jar. The jar is sealed and placed in an oven at 90-95° C. for 5 days. After the 5-day soak period, the sample is removed from solution, rinsed with DI water, dried at room temperature for at least three hours, and weighed. A raw weight loss figure is calculated. In order to control for differences in weight before and after soaking that can be attributed to changes in ambient relative humidity between day 0 and day 5, a separate piece of each membrane sample (that is never exposed to the peroxide) is weighed at the beginning and at the end of the soak period. To arrive at a corrected weight loss reading, the calculated figure for raw weight fraction remaining after soaking (for the soaked sample) is first divided by the weight fraction "remaining" for the piece of membrane that is not soaked. The latter treatment assumes that the effect of weight change due to a change in relative humidity is multiplicative in its deviating effect on measured weight loss for the soaked sample.

The results of the testing are given in Table I for the soaked samples and for the humidity control samples, which are designated "control".

TABLE I

| Example | Additive | Starting Mass | Final Mass | Raw Mass Change | Corrected Mass Change |
|---|---|---|---|---|---|
| 1 | 0.025 mmol $Mn^{2+}$ | 0.0430 | 0.0394 | −8.4% | −7.5% |
| 1 control | 0.025 mmol $Mn^{2+}$ | 0.0515 | 0.0510 | −1.0% | 0.0% |
| 2 | 0.050 mmol $Mn^{2+}$ | 0.0502 | 0.0468 | −6.8% | −5.7% |
| 2 control | 0.050 mmol $Mn^{2+}$ | 0.0464 | 0.0459 | −1.1% | 0.0% |
| 3 | 0.034 mmol $Ru^{3+}$ | 0.0413 | 0.0404 | −2.2% | −1.5% |
| 3 control | 0.034 mmol $Ru^{3+}$ | 0.0449 | 0.0446 | −0.7% | 0.0% |
| 4 | 0.067 mmol $Ru^{3+}$ | 0.0431 | 0.0418 | −3.0% | −2.1% |
| 4 control | 0.067 mmol $Ru^{3+}$ | 0.0462 | 0.0458 | −0.9% | 0.0% |
| 5C | None | 0.0484 | 0.0436 | −9.9% | −8.9% |
| 5C control | None | 0.0437 | 0.0432 | −1.1% | 0.0% |

The undoped and the manganese-exchanged samples were colorless after exposure to the peroxide solution. The ruthenium-exchanged samples retained some pink color after the test.

These results indicate that partial exchange by ruthenium or manganese ions was effective in reducing the weight loss due to the action of hydrogen peroxide. While the comparative example lost 8.9%, the examples according to the present invention lost less: 7.5%, 5.7%, 1.5% and 2.1%.

MEA Fabrication for Examples 6 & 7C

Fuel cell MEA's having 50 cm² of active area were prepared as follows. Catalyst dispersions were prepared according to the method described in WO 2002/061,871, incorporated herein by reference. To prepare catalyst-coated membranes, anode and cathode layers were applied to membranes according to the decal transfer method described in the same reference, WO 2002/061,871. PTFE-treated carbon paper gas diffusion layers and polytetrafluoroethylene/glass composite gaskets were applied to the CCM by pressing in a Carver Press (Fred Carver Co., Wabash, Ind.) with 13.4 kN of force at 132° C. for 10 minutes.

MEA Lifetime Test for Examples 6 & 7C

The MEA's were tested in a test station with independent controls of gas flow, pressure, relative humidity, and current or voltage (Fuel Cell Technologies, Albuquerque, N. Mex.). The test fixture included graphite current collector plates with quad-serpentine flow fields. MEA's were operated with $H_2$/air under subsaturated conditions at 90° C. with anode overpressure. The MEA's were subjected to an accelerated load cycle lifetime test by imposition of a variety of current density values. After each load cycle, the open circuit voltage (OCV) of the cell was measured and recorded. The general phenomenology for such a test protocol is for the OCV to decay monotonically, but with a distinct "knee" or pronounced increase in the decay rate. The point at which the decay rate increases is taken as the lifetime of the MEA.

Examples 6 & 7C

For Example 6, 200 g of an ionomer casting solution containing 23 wt % solids (i.e., 46 g of the ionomeric polymer, EW 1000) in 70:30 n-propanol/water was dispensed into a 250 ml plastic bottle. 0.33 g of 52 wt % $Mn(NO_3)_2$ (J. T. Baker 2544-01, Phillipsburg, N.J.) (i.e., 0.96 mmol $Mn^{2+}$) was added to the casting solution with stirring, giving a clear casting solution after two hours. The quantities above yield a solution with 0.02 mmols $Mn^{2+}$ per gram of EW1000 polymer and thus 0.04 charge equivalents $Mn^{2+}$, based on the molar amount of acid functional groups initially present in the polymer. Using the ionomer coating solution with $Mn(NO_3)_2$ added, a polymer membrane was cast according to the method described in U.S. patent application Ser. No. 09/837, 771, filed Apr. 18, 2001, incorporated herein by reference.

For Example 7C, polymer membranes were cast as indicated for Example 6 using the same ionomer casting solution but without the added $Mn(NO_3)_2$.

MEA's were fabricated according to the method described above from membranes according to Examples 6 and 7C. The MEA's were tested according to the lifetime test described above. The results are reported in Table 2.

TABLE 2

| Example | Lifetime (hours) |
|---|---|
| 6 | 196 |
| 7C | 59 |

Examples 6 and 7C demonstrate an increase in durability, under operating conditions, of more than 3× for membranes according to the present invention.

Titration of Ionomer Membranes for Examples 8C, 9 and 10

Titrations were performed to determine the acid content of ionomer membranes prepared with addition of ionic manganese. For each titration, a carefully weighed sample of ionomer film, approximately 0.1 g, was added to 100 ml of 0.1M NaCl solution. 0.05M NaOH solution was slowly added to the sample solution using a burette and the end point was determined using a pH meter. The amount of NaOH necessary to neutralize the acid was taken as the acid content of the membrane.

Example 8C

The procedure of Example 5C was repeated, except that the cast layer was allowed to dry for 15 min before oven treatment, instead of 20 min. Also, the film was removed from the carrier glass by peeling, as opposed to release by water wetting. Titration of the membrane indicated an acid content of 1.00 meq/g, confirming the EW of 1000 for this ionomer.

Example 9

16.80 grams of an ionomer casting solution containing 22.3% solids (i.e., 3.746 g of the ionomeric polymer) in 70:30 n-propanol/water was dispensed into a glass vial. 0.0264 g of 52 wt % $Mn(NO_3)_2$ (J. T. Baker 2544-01, Phillipsburg, N.J.) (i.e., 0.0764 mmol $Mn^{2+}$) was added to the casting dispersion with stirring, and allowed to homogenize for 2 hours. Since the EW of the polymer is 1000, about 0.04 charge equivalents of $Mn^{2+}$ were added. A membrane was cast on window glass by "hand-spread" technique using the 20 mil gap of a 4-inch multiple clearance applicator (Cat. No. PAR-5357, BYK-Gardner, Columbia, Md.). The membrane film was allowed to dry in room temperature air for 15 minutes, placed in an 80° C. oven for 10 minutes, and then placed in a 200° C. oven for 15 minutes. The membrane was removed from the carrier glass by peeling. The resulting annealed membrane was homogeneous (i.e., non-light-scattering) to the eye.

Titration of the membrane indicated an acid content of 0.95 meq/g.

Example 10

15.41 grams of an ionomer casting solution containing 22.3% solids (i.e., 3.436 g of the ionomeric polymer) in 70:30 n-propanol/water was dispensed into a glass vial. 0.0479 g of 52 wt % $Mn(NO_3)_2$ (J. T. Baker 2544-01, Phillipsburg, N.J.) (i.e., 0.139 mmol $Mn^{2+}$) was added to the casting dispersion with stirring, and allowed to homogenize for 2 hours. Since the EW of the polymer is 1000, about 0.08 charge equivalents of $Mn^{2+}$ were added. A membrane was cast on window glass by "hand-spread" technique using the 20 mil gap of a 4-inch multiple clearance applicator (Cat. No. PAR-5357, BYK-Gardner, Columbia, Md.). The membrane film was allowed to dry in room temperature air for 15 minutes, placed in an 80° C. oven for 10 minutes, and then placed in a 200° C. oven for 15 minutes. The membrane removed from the carrier glass by peeling. The resulting annealed membrane was homogeneous (i.e., non-light-scattering) to the eye.

Titration of the membrane indicated an acid content of 0.91 meq/g.

Examples 8C, 9 and 10 indicate that the addition of an increasing amount of manganese salt before membrane casting neutralized an increasing amount of acid form anionic functional groups and that the acid form of the former manganese salt is removed. The extent of neutralization suggests that the $Mn^{2+}$ ions, due to their double valence, may form crosslinks between anionic functional groups of the polymer.

MEA Fabrication for Examples 11 & 12C

Fuel cell MEA's having 50 $cm^2$ of active area were prepared as follows. Using a Nafion® SE-20092 ionomer casting solution (DuPont Chemical Company, Wilmington, Del.), a polymer membrane was cast according to the method described in U.S. patent application Ser. No. 09/837,771, filed Apr. 18, 2001, incorporated herein by reference. An electrocatalyst layer was applied to one side of the membrane by handbrushing an ink, described below for each example. The final Pt loading was 0.4 mg/$cm^2$. The ink was dried at 100° C. at a pressure of less than 1 ton for 20 min. To assemble the MEA, two pieces of CCM were sandwiched together with PTFE-treated carbon paper gas diffusion layers and polytetrafluoroethylene/glass composite gaskets. This assembly was pressed in a Carver Press (Fred Carver Co., Wabash, Ind.) with 13.4 kN of force at 132° C. for 10 min.

MEA Testing for Examples 11 & 12C

The MEA's were tested in a test station with independent controls of gas flow, pressure, relative humidity, and current or voltage (Fuel Cell Technologies, Albuquerque, N.M.). The test fixture included graphite current collector plates with quad-serpentine flow fields. MEA's were operated with constant stoichiometry 1.2/2.5 for $H_2$/air under saturated conditions at 70° C. and 0.6 A/$cm^2$. Effluent water was collected from the cell over a period of 48 hours. The content of fluoride in the effluent water was measured using a ion chromatography system (Dionex ICS-2000, Sunyvale, Calif.). Accounting for the duration over which the water was collected, a fluoride release rate was calculated, in units of micrograms per minute, and taken as an indication of membrane degradation rate.

Examples 11 and 12C

To prepare the electrocatalyst ink for Example 11, 48 g of 10 wt % solution of perfluorosulfonic acid ionomer in water (Nafion® SE-10172, (DuPont Chemical Company, Wilmington, Del.) was combined with 48 g water, 0.024 g of 50 wt % $Mn(NO_3)_2$ (J. T. Baker 2544-01, Phillipsburg, N.J.), and 12 g of 50% Pt/50% C catalyst (SA50E, NECC, Japan). The mixture was mixed using a microfluidizer. To prepare the electrocatalyst ink for Example 12C, 24 g of 10 wt % solution of perfluorosulfonic acid ionomer in water (Nafion® SE-10172, (DuPont Chemical Company, Wilmington, Del.) was combined with 24 g water, and 6 g of 50% Pt/50% C catalyst (SA50E, NECC, Japan). The mixture was mixed using a microfluidizer. Table 3 gives fluoride release rates for the MEA's prepared according to the methods above.

TABLE 3

| Example | Fluoride Release Rate (microgram/min) |
|---|---|
| 11 | 0.013 |
| 12C | 0.91 |

Various modifications and alterations of this invention will become apparent to those skilled in the art without departing from the scope and principles of this invention, and it should be understood that this invention is not to be unduly limited to the illustrative embodiments set forth hereinabove.

We claim:

1. A method of making a polymer electrolyte membrane comprising the steps of:
   a) providing a suspension of a polymer electrolyte in acid form;
   b) mixing a salt of manganese with the suspension; and thereafter
   c) casting a membrane from the suspension.

2. The method according to claim 1 wherein the salt of manganese is a salt of manganese cations selected from the group consisting of $Mn^{2+}$, $Mn^{3+}$ and $Mn^+$.

3. The method according to claim 1 wherein the salt of manganese is a salt of $Mn^{2+}$ cations.

4. The method according to claim 1 wherein the salt of manganese is selected from the group consisting of chlorides and nitrates.

5. The method according to claim 3 wherein the salt of manganese is selected from the group consisting of chlorides and nitrates.

6. The method according to claim 1 wherein the salt of manganese is $Mn(NO_3)_2$.

7. The method according to claim 1 wherein the amount the salt of manganese added is between 0.001 and 0.5 charge equivalents based on the molar amount of acid functional groups present in the polymer electrolyte.

8. The method according to claim 1 wherein the amount the salt of manganese added is between 0.005 and 0.2 charge equivalents based on the molar amount of acid functional groups present in the polymer electrolyte.

9. The method according to claim 1 wherein the amount the salt of manganese added is between 0.01 and 0.1 charge equivalents based on the molar amount of acid functional groups present in the polymer electrolyte.

10. The method according to claim 3 wherein the amount the salt of manganese added is between 0.01 and 0.1 charge equivalents based on the molar amount of acid functional groups present in the polymer electrolyte.

11. The method according to claim 4 wherein the amount the salt of manganese added is between 0.01 and 0.1 charge equivalents based on the molar amount of acid functional groups present in the polymer electrolyte.

12. The method according to claim 5 wherein the amount the salt of manganese added is between 0.01 and 0.1 charge equivalents based on the molar amount of acid functional groups present in the polymer electrolyte.

13. The method according to claim 6 wherein the amount the salt of manganese added is between 0.01 and 0.1 charge equivalents based on the molar amount of acid functional groups present in the polymer electrolyte.

14. The method according to claim 1 wherein the amount the salt of manganese added is between 0.02 and 0.05 charge equivalents based on the molar amount of acid functional groups present in the polymer electrolyte.

15. The method according to claim 1 wherein the polymer electrolyte has an equivalent weight 1000 or less.

16. The method according to claim 1 wherein the polymer electrolyte has an equivalent weight 900 or less.

17. The method according to claim 1 wherein the polymer electrolyte has an equivalent weight 800 or less.

18. The method according to claim 1 wherein the polymer electrolyte comprises pendent groups according to the formula: —O—$CF_2$—$CF_2$—$CF_2$—$CF_2$—$SO_3H$.

19. The method according to claim 1 wherein the polymer electrolyte is highly fluorinated.

20. The method according to claim 1 wherein the polymer electrolyte is perfluorinated.

21. The method according to claim 1 wherein the step of casting is accomplished by a method chosen from the group consisting of bar coating, spray coating, slit coating, and brush coating.

22. The method according to claim 1, additionally comprising the step, after step c), of:
 d) annealing the membrane at a temperature of 150° C. or higher.

23. A casting solution comprising a suspension of a polymer electrolyte in acid form and mixed therein a salt of manganese.

24. The casting solution according to claim 23 wherein the salt of manganese is a salt of manganese cations selected from the group consisting of $Mn^{2+}$, $Mn^{3+}$ and $Mn^+$.

25. The casting solution according to claim 23 wherein the salt of manganese is a salt of $Mn^{2+}$ cations.

26. The casting solution according to claim 23 wherein the salt of manganese is selected from the group consisting of chlorides and nitrates.

27. The casting solution according to claim 25 wherein the salt of manganese is selected from the group consisting of chlorides and nitrates.

28. The casting solution according to claim 23 wherein the salt of manganese is $Mn(NO_3)_2$.

29. The casting solution according to claim 23 wherein the amount the salt of manganese added is between 0.001 and 0.5 charge equivalents based on the molar amount of acid functional groups present in the polymer electrolyte.

30. The casting solution according to claim 23 wherein the amount the salt of manganese added is between 0.005 and 0.2 charge equivalents based on the molar amount of acid functional groups present in the polymer electrolyte.

31. The casting solution according to claim 23 wherein the amount the salt of manganese added is between 0.01 and 0.1 charge equivalents based on the molar amount of acid functional groups present in the polymer electrolyte.

32. The casting solution according to claim 25 wherein the amount the salt of manganese added is between 0.01 and 0.1 charge equivalents based on the molar amount of acid functional groups present in the polymer electrolyte.

33. The casting solution according to claim 26 wherein the amount the salt of manganese added is between 0.01 and 0.1 charge equivalents based on the molar amount of acid functional groups present in the polymer electrolyte.

34. The casting solution according to claim 27 wherein the amount the salt of manganese added is between 0.01 and 0.1 charge equivalents based on the molar amount of acid functional groups present in the polymer electrolyte.

35. The casting solution according to claim 28 wherein the amount the salt of manganese added is between 0.01 and 0.1 charge equivalents based on the molar amount of acid functional groups present in the polymer electrolyte.

36. The casting solution according to claim 23 wherein the amount the salt of manganese added is between 0.02 and 0.05 charge equivalents based on the molar amount of acid functional groups present in the polymer electrolyte.

37. The casting solution according to claim 23 wherein the polymer electrolyte has an equivalent weight 1000 or less.

38. The casting solution according to claim 25 wherein the polymer electrolyte has an equivalent weight 1000 or less.

39. The casting solution according to claim 27 wherein the polymer electrolyte has an equivalent weight 1000 or less.

40. The casting solution according to claim 28 wherein the polymer electrolyte has an equivalent weight 1000 or less.

41. The casting solution according to claim 34 wherein the polymer electrolyte has an equivalent weight 1000 or less.

42. The casting solution according to claim 35 wherein the polymer electrolyte has an equivalent weight 1000 or less.

43. The casting solution according to claim 23 wherein the polymer electrolyte has an equivalent weight 900 or less.

44. The casting solution according to claim 23 wherein the polymer electrolyte has an equivalent weight 800 or less.

45. The casting solution according to claim 23 wherein the polymer electrolyte comprises pendent groups according to the formula: —O—$CF_2$—$CF_2$—$CF_2$—$CF_2$—$SO_3H$.

46. The casting solution according to claim 23 wherein the polymer electrolyte is highly fluorinated.

47. The casting solution according to claim 23 wherein the polymer electrolyte is perfluorinated.

48. The method according to claim 1 wherein the membrane comprises bound anionic functional groups and a portion of the anionic functional groups are neutralized by manganese cations.

49. The casting solution according to claim 23 wherein the polymer electrolyte comprises bound anionic functional groups and a portion of the anionic functional groups are neutralized by manganese cations.

* * * * *

UNITED STATES PATENT AND TRADEMARK OFFICE
CERTIFICATE OF CORRECTION

PATENT NO. : 9,034,538 B2  
APPLICATION NO. : 12/862071  
DATED : May 19, 2015  
INVENTOR(S) : Matthew Frey It is certified that error appears in the above-identified patent and that said Letters Patent is hereby corrected as shown below:

Specification

Column 1
Line 56, delete "H+" and insert -- $H^+$ --, therefor.

Column 2
Line 13, delete "$R^{3+}$" and insert -- $Ru^{3+}$ --, therefor.

Line 14, delete "$R^{4+}$." and insert -- $Ru^{4+}$. --, therefor.

Line 19, delete "—O—$CF_2$—$CF_2$—$CF_2$—$CF_2SO_3H$" and insert -- -O-$CF_2$-$CF_2$-$CF_2$-$CF_2$-$SO_3H$ --, therefor.

Line 38, delete "$R^{3+}$" and insert -- $Ru^{3+}$ --, therefor.

Line 40, delete "$R^{4+}$." and insert -- $Ru^{4+}$. --, therefor.

Line 62, delete "$R^{3+}$" and insert -- $Ru^{3+}$ --, therefor.

Line 64, delete "$R^{4+}$." and insert -- $Ru^{4+}$. --, therefor.

Column 3
Line 21, delete "$R^{3+}$" and insert -- $Ru^{3+}$ --, therefor.

Line 22, delete "$R^{4+}$." and insert -- $Ru^{4+}$. --, therefor.

Line 41, delete "$R^{3+}$" and insert -- $Ru^{3+}$ --, therefor.

Line 43, delete "$R^{4+}$." and insert -- $Ru^{4+}$. --, therefor.

Signed and Sealed this  
Twenty-third Day of February, 2016

Michelle K. Lee  
*Director of the United States Patent and Trademark Office*

Specification

Column 6
Line 10, delete "$R^{3+}$ and $R^{4+}$," and insert -- $Ru^{3+}$ and $Ru^{4+}$, --, therefor.

Line 10, delete "$R^{3+}$." and insert -- $Ru^{3+}$. --, therefor.

Column 8
Line 29, delete "$R^{3+}/g$" and insert -- $Ru^{3+}/g$ --, therefor.

Line 33, delete "$R^{3+})$" and insert -- $Ru^{3+})$ --, therefor.

Line 39, delete "$R^{3+}$" and insert -- $Ru^{3+}$ --, therefor.

Line 45, delete "$R^{3+}/g$" and insert -- $Ru^{3+}/g$ --, therefor.

Line 50, delete "$R^{3+})$." and insert -- $Ru^{3+})$. --, therefor.

Line 51, delete "$R^{3+}$" and insert -- $Ru^{3+}$ --, therefor.

Column 11
Line 52, delete "ton" and insert -- torr --, therefor.

Claims

Column 12
Line 47, in Claim 2, delete "$Mn^{+}$." and insert -- $Mn^{4+}$. --, therefor.

Column 13
Line 50, in Claim 24, delete "$Mn^{+}$." and insert -- $Mn^{4+}$. --, therefor.